Sept. 20, 1949.   S. RUBEN   2,482,514
PRIMARY CELL WITH MERCURY ABSORBENT
Filed May 21, 1946
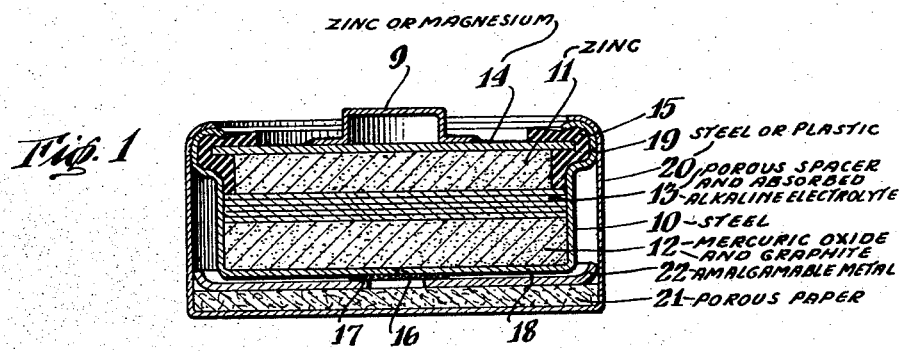
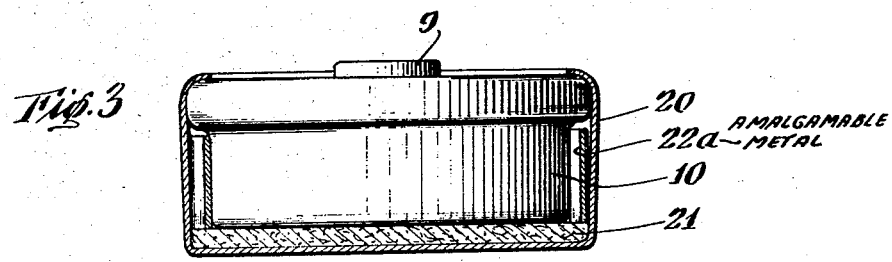
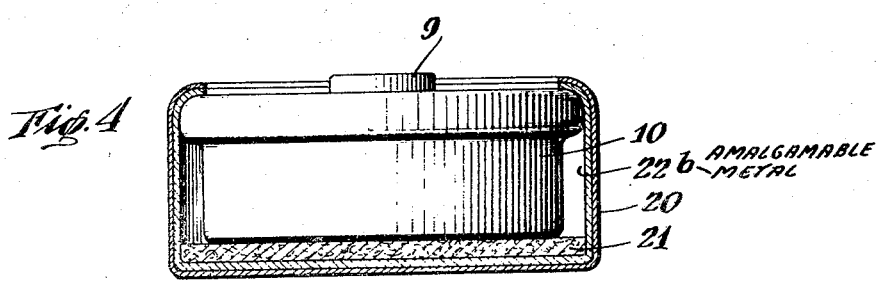
INVENTOR.
Samuel Ruben
BY Nicholas Langer
ATTORNEY Patented Sept. 20, 1949

2,482,514

UNITED STATES PATENT OFFICE 2,482,514

PRIMARY CELL WITH MERCURY ABSORBENT

Samuel Ruben, New Rochelle, N. Y.

Application May 21, 1946, Serial No. 671,201

4 Claims. (Cl. 136—107)

This invention relates to electric primary cells.

An object of the invention is to improve primary cells.

The invention has application to primary cells containing mercury or mercury compounds which are reduced to mercury during cell operation. A feature of the invention resides in the combination with the primary cell of an outer receptacle in which a mercury absorbent material or metal is provided. Other aspects of the invention will be apparent from the following description and the claims.

In the drawing:

Figure 1 is an axial section through a primary cell embodying features of the invention;

Figure 2 is a detail fragmentary sectional view; and

Figures 3 and 4 illustrate modified cell structures.

Referring to the drawing, the cell of Figure 1 comprises a container 10 in which are sealed the cell electrodes 11 and 12 separated by a porous spacer 13 impregnated with an electrolyte. The cell is closed by a top disc 14 sealed in the mouth of container 10 by resilient insulating grommet 15. Top 10 is provided with a terminal boss 9.

In one embodiment of the invention electrode 11 may be a body of amalgamated zinc, the electrolyte in spacer 13 may be an aqueous alkaline solution such as a solution of potassium hydroxide, and electrode 12 may be a depolarizer body of mercuric oxide mixed with graphite. Container 10 may be formed of steel and top 14 of amalgamated zinc, or of magnesium. In operation of the cell the mercuric oxide in electrode 12 becomes reduced to liquid mercury.

The container 10 is provided with an emergency vent 16 (see Figure 2) which may comprise a closed crack or split in the container wall. This may be formed by punching a slit in the bottom wall 18 with a chisel-like tool and then stamping the metal together again to close the slit 16. The vent slit 16 may be sealed with a lacquer layer 17.

The slit 16 functions as an emergency vent should gas pressure develop within the cell during shelf life or use, due to impurities in the materials used, improper storage conditions, or other causes. If gas develops the pressure will bulge the bottom wall 18 slightly and open slit 16 sufficiently to permit escape of liquid or gas from the container. The slit also serves as an end-of-life vent to relieve the pressure due to any gas which may be generated at the end of cell life after all the mercuric oxide depolarizer has been reduced to liquid mercury.

It is evident that alkaline electrolyte and liquid mercury may escape from the container 10 if venting occurs. According to one aspect of the present invention an outer receptacle 20 is provided enclosing the bottom and sides of container 10. The free edge of receptacle 20 is turned in over the bead 19 of container 10 where it encloses the grommet 15. Receptacle 20 is formed of steel or other non-amalgamable metal, or of a plastic. Within the receptacle 20 is a disc 21 of porous absorbent paper or cellulose and a washer 22 having a central hole, of readily amalgamable or combinable metal, such as lead or tin. Paper 21 may, if desired, be treated with a neutralizing agent for the electrolyte, such as boric acid, rosin, or the like.

The receptacle 20 and discs 21 and 22 provide protection against leakage of either electrolyte, liquid mercury or both. The electrolyte solution escaping from vent 16 is immediately absorbed by paper layer 21 and any escaping mercury is taken up and amalgamated with metal disc 22.

Figure 3 shows a modified cell construction wherein the mercury absorbing metal is in the form of a corrugated strip 22a wrapped around the cylindrical wall of the container 10 inside receptacle 20.

Figure 4 shows a further modification wherein the amalgamable metal is provided in the form of a coating 22b on the inside of steel receptacle 20, produced by electroplating, spraying or dipping.

What is claimed is:

1. In combination with a dry cell comprising a sealed container, an anode, an electrolyte, a depolarizer containing mercuric oxide which is reduced to mercury during operation of the cell, and an emergency vent responsive to excessive internal pressure within said cell; an outer container partially enclosing said cell and defining therewith a closed space into which said vent opens, and a readily amalgamable metal in said space adapted to combine with and to take up any mercury escaping through said vent.

2. In combination, a dry cell comprising a sealed container, an anode, an electrolyte and a depolarizer comprising mercuric oxide adapted to be reduced to mercury during operation of the cell, an outer container partially enclosing said cell, said cell having a weakened ventable section adjoining the space between the cell and the outer container, and a readily amalgamable metal selected from the group consisting of lead and tin in said space adapted to combine with and take up any mercury escaping through the ventable section of the cell.

3. The combination described in claim 1 characterized in that the space between the cell and the outer container also contains an absorbent for electrolyte escaping through the vent into said space.

4. In combination, a sealed dry cell comprising a steel container, a zinc anode, an alkaline electrolyte, a depolarizer comprising mercuric oxide housed in said steel container, said depolarizer being adapted to reduce to liquid mercury during operation of the cell, a weakened section in said steel container serving as an emergency vent and adapted to open when gas is generated in said cell, an outer metal casing partially enclosing said cell, and connected thereto, a quantity of lead and a quantity of cellulose absorbent in the space between the cell and the outer casing, said lead being adapted to take up and combine with any mercury escaping through said vent and said cellulose being adapted to absorb any electrolyte escaping through said vent.

SAMUEL RUBEN.

REFERENCES CITED

The following references are of record in the file of this patent:

UNITED STATES PATENTS

| Number | Name | Date |
| --- | --- | --- |
| 914,038 | Gugler | Mar. 2, 1909 |
| 1,028,354 | Heil | June 4, 1912 |
| 1,086,710 | Hoopes | Feb. 10, 1914 |
| 1,295,122 | Chamberlain | Feb. 25, 1919 |
| 1,843,698 | Ruben | Feb. 2, 1932 |
| 2,332,456 | McEachron et al. | Oct. 19, 1943 |